US012704081B1

(12) United States Patent
Savard et al.

(10) Patent No.: US 12,704,081 B1
(45) Date of Patent: Aug. 11, 2026

(54) GAS TURBINE ENGINE WITH A ROTOR STAGE SHROUD

(71) Applicant: Pratt & Whitney Canada Corp., Longueuil (CA)

(72) Inventors: Philippe Savard, Terrebonne (CA); Guy Lefebvre, St-Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/204,016

(22) Filed: May 9, 2025

(51) Int. Cl.
*F01D 25/24* (2006.01)
*F01D 11/18* (2006.01)

(52) U.S. Cl.
CPC ............ *F01D 25/246* (2013.01); *F01D 11/18* (2013.01); *F05D 2240/11* (2013.01); *F05D 2260/30* (2013.01); *F05D 2300/6033* (2013.01)

(58) Field of Classification Search
CPC ........ F01D 11/005; F01D 11/08; F01D 11/18; F01D 25/246
See application file for complete search history.

(56) References Cited

U.S. PATENT DOCUMENTS 6,116,852 A * 9/2000 Pierre .................... F01D 11/18 415/176
6,758,653 B2 7/2004 Morrison
8,740,552 B2 6/2014 Marusko
9,587,517 B2 3/2017 Vetters
9,726,044 B2 * 8/2017 Stevens ................ F01D 25/246
10,100,659 B2 10/2018 Lamusga
10,577,963 B2 3/2020 McCaffrey
10,577,970 B2 3/2020 Jennings
10,619,514 B2 4/2020 Walston
10,683,770 B2 6/2020 Freeman
11,053,817 B2 7/2021 Freeman
11,143,050 B2 10/2021 Roy Thill
11,174,747 B2 11/2021 Roy Thill
11,174,795 B2 * 11/2021 Lutjen .................. F01D 11/005
11,208,911 B2 12/2021 Sadler
11,208,918 B2 12/2021 Sippel
11,220,925 B2 1/2022 Freeman
11,713,694 B1 8/2023 Freeman
11,773,751 B1 * 10/2023 Freeman ................ F01D 11/08 415/173.1
11,840,936 B1 * 12/2023 Freeman ............... F01D 25/246
(Continued)

*Primary Examiner* — Nathaniel E Wiehe
*Assistant Examiner* — Jackson N Gillenwaters
(74) *Attorney, Agent, or Firm* — Getz Balich LLC

(57) ABSTRACT

A gas turbine engine is provided that includes a compressor section, a combustor section, and a turbine section. The turbine section includes a rotor stage and an annular shroud assembly. The rotor stage includes a bladed rotor. The annular shroud assembly is disposed radially outside of the bladed rotor, and extends circumferentially around the bladed rotor, and is coupled with a turbine support case. The annular shroud assembly includes a shroud, a shroud segment housing, a cover, and a plurality of shroud pins. The shroud includes a plurality of shroud segments that collectively form the shroud. Each shroud segment includes a ring portion, a forward leg, and an aft leg. The shroud pins are disposed to connect the shroud to the shroud segment housing and the cover. The shroud segment housing and the turbine support case are engaged with one another and are configured to permit relative movement therebetween.

18 Claims, 13 Drawing Sheets

(56) References Cited

U.S. PATENT DOCUMENTS

| | | | | |
|---|---|---|---|---|
| 12,196,100 | B1 | 1/2025 | Wu | |
| 2011/0182724 | A1* | 7/2011 | Koyabu ................ | F01D 25/246<br>415/180 |
| 2021/0172339 | A1 | 6/2021 | Freeman | |

* cited by examiner

GAS TURBINE ENGINE WITH A ROTOR STAGE SHROUD

BACKGROUND OF THE INVENTION

1. Technical Field

The present disclosure relates to a gas turbine engines in general, and to gas turbine engine rotor shrouds in particular.

2. Background Information

A shroud may be disposed radially outside of the rotor blades of a rotor stage within a gas turbine engine to minimize core gas leakage at the tips of the rotor blades during operation and thereby improve the efficiency of the rotor stage. Core gas bypassing the rotor blades in a turbine section does not perform any work on the rotor blades. A shroud that minimizes core gas blade tip leakage would be of significant value.

SUMMARY

According to an aspect of the present disclosure, a gas turbine engine having an axial centerline is provided that includes a compressor section, a combustor section, and a turbine section. The turbine section includes a rotor stage and an annular shroud assembly. The rotor stage includes a bladed rotor. The annular shroud assembly is disposed radially outside of the bladed rotor, and extends circumferentially around the bladed rotor, and is coupled with a turbine support case. The annular shroud assembly includes a shroud, a shroud segment housing, a cover, and a plurality of shroud pins. The shroud includes a plurality of shroud segments that collectively form the shroud. Each shroud segment includes a ring portion, a forward leg, and an aft leg. The shroud pins are disposed to connect the shroud to the shroud segment housing and the cover. The shroud segment housing and the turbine support case are engaged with one another and are configured to permit relative movement therebetween.

In any of the aspects or embodiments described above and herein, the annular shroud assembly may be configured to accommodate disparate thermal expansion of the shroud relative to the turbine support case.

In any of the aspects or embodiments described above and herein, the annular shroud assembly and the turbine support case may be configured to permit radial movement between the shroud assembly and the turbine support case.

In any of the aspects or embodiments described above and herein, the shroud segment housing and the turbine support case may be configured to permit radial movement between the shroud segment housing and the turbine support case.

In any of the aspects or embodiments described above and herein, the shroud segment housing and the turbine support case may be configured with mating male and female elements that permit radial movement between the shroud segment housing and the turbine support case.

In any of the aspects or embodiments described above and herein, the shroud segment housing may include a plurality of lugs and the turbine support case includes a plurality of slots configured to receive the lugs.

In any of the aspects or embodiments described above and herein, the turbine support case may include a first flange segment that extends axially out from a radially extending second flange segment, wherein the slots are disposed in the second flange segment.

In any of the aspects or embodiments described above and herein, each shroud pin may extend through the forward and aft legs of one of the shroud segments.

In any of the aspects or embodiments described above and herein, the ring portion of each shroud segment may have an inner radial surface and an outer radial surface and the forward leg and the aft leg may extend outwardly from the outer radial surface of the ring portion.

In any of the aspects or embodiments described above and herein, the shroud segment housing may include a central member and a forward flange, and the plurality of shroud pins are engaged with the central member.

In any of the aspects or embodiments described above and herein, the cover may include an axial segment and a radial segment, wherein the axial segment may be connected to the radial segment and may extend outwardly from the radial segment.

In any of the aspects or embodiments described above and herein, a first end of each shroud pin may be engaged with the central member, and a second end of each shroud pin may be engaged with the radial segment.

In any of the aspects or embodiments described above and herein, the forward flange may be in contact with the axial segment.

In any of the aspects or embodiments described above and herein, the annular shroud assembly may include a cover retaining ring engaged with the turbine support case.

In any of the aspects or embodiments described above and herein, the turbine support case may include a first flange segment that extends axially out from a radially extending second flange segment, and the first flange segment may include a ring slot configured to receive the cover retaining ring. Axial movement of the annular shroud assembly may be axially constrained by the second flange segment and the cover retaining ring.

In any of the aspects or embodiments described above and herein, the turbine support case may include a first flange segment that extends axially out from a radially extending second flange segment, and the first flange segment may include a plurality of cooling apertures that provide fluid communication between a first region radially outside of the turbine support case and a second region radially inside of the turbine support case that is in fluid communication with the annular shroud assembly.

In any of the aspects or embodiments described above and herein, the plurality of shroud segments may comprise a ceramic matrix composite material.

According to an aspect of the present disclosure, a rotor stage shroud assembly for a gas turbine engine is provided. The gas turbine engine has a turbine support case and a turbine section that includes a rotor stage with a bladed rotor. The turbine support case is disposed radially outside of the rotor stage. The shroud assembly includes a shroud, a shroud segment housing, a cover, and a plurality of pins. The shroud includes a plurality of shroud segments that collectively form the shroud. Each shroud segment includes a ring portion, a forward leg, and an aft leg. The shroud pins are disposed to connect the shroud to the shroud segment housing and the cover. The shroud segment housing and the turbine support case are engaged with one another and are configured to permit relative movement therebetween.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. The following description and drawings are intended to be exemplary in nature and non-limiting.

DETAILED DESCRIPTION

Figure 1:
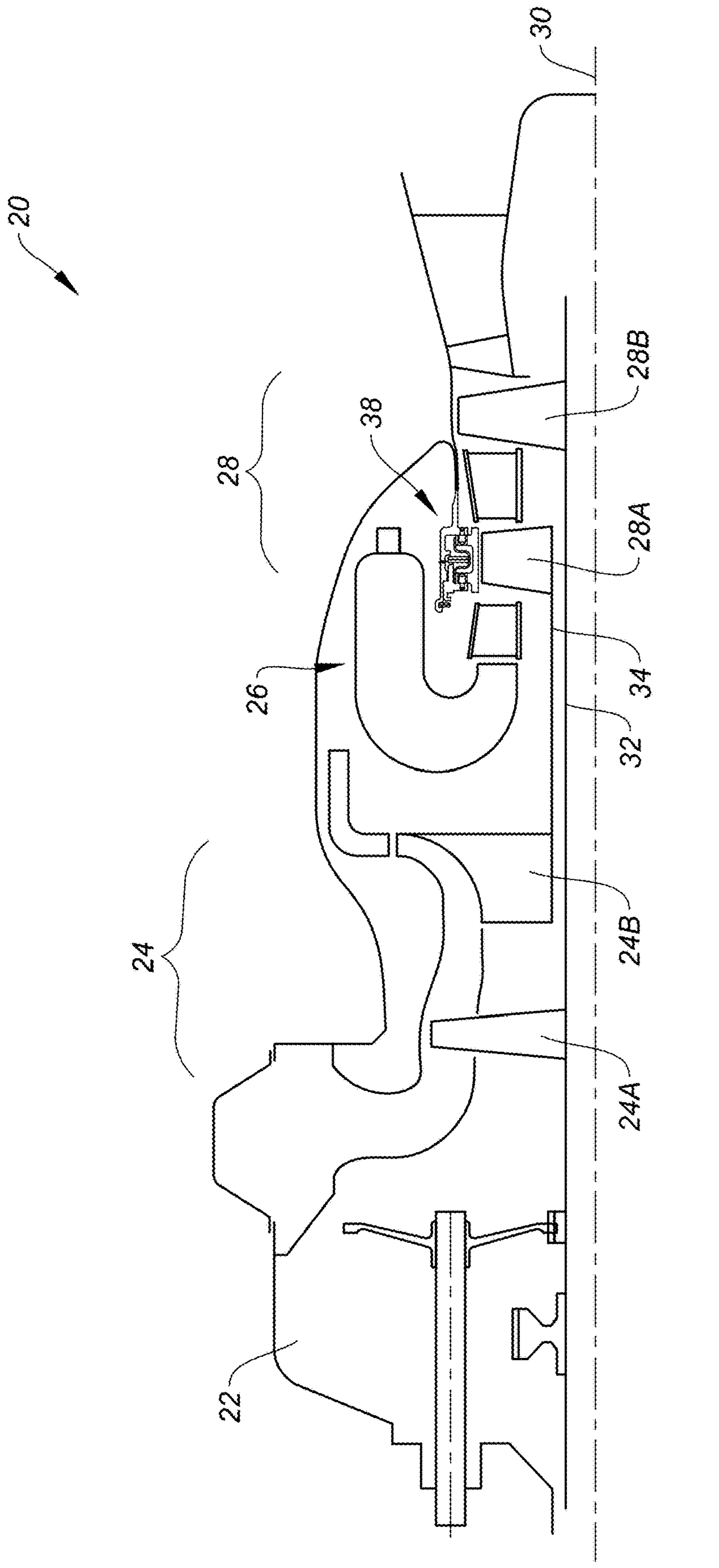
FIG. 1 is a diagrammatic illustration of a gas turbine engine.
Figure 2:
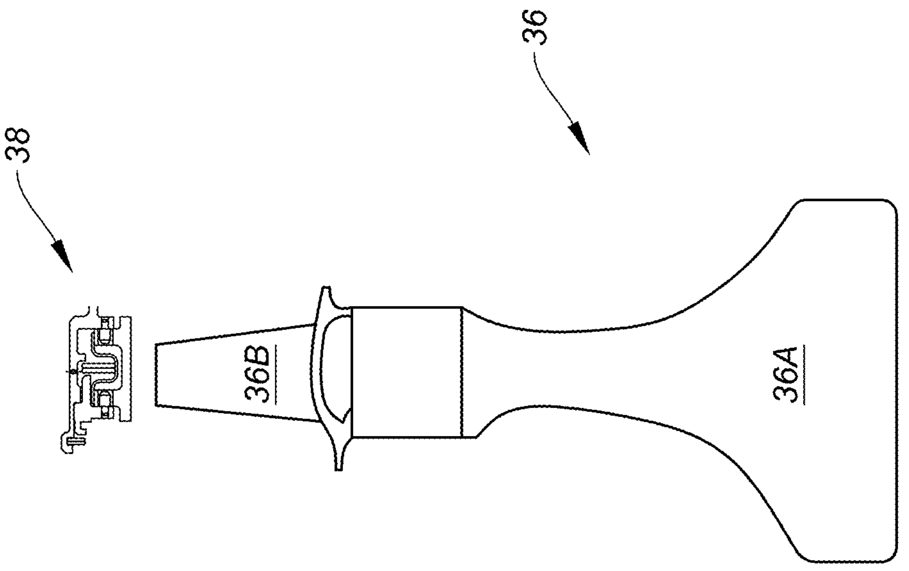
FIG. 2 is a diagrammatic view of a rotor stage with a shroud assembly.

FIG. 1 diagrammatically illustrates an example of a gas turbine engine 20 that includes a gearbox 22, a compressor section 24, a combustor section 26, and a turbine section 28 disposed relative to a axial rotational axis 30. The compressor section 24 includes a low pressure compressor 24A (LPC) and a high pressure compressor 24B (HPC). The turbine section 28 includes a high pressure turbine 28A (HPT) and a low pressure turbine 28B (LPT). A low speed shaft 32 connects the LPC 24A and the LPT 28B. A high speed shaft 34 connects the HPC 24B and the HPT 28A. The low speed shaft 32 and the high speed shaft 34 are mounted for rotation about the axial rotational axis 30. The low speed shaft 32 may drive the gearbox 22. The LPC 24A, HPC 24B, LPT 28B, and the HPT 28A may each include one or more rotor stages and one or more stator vane stages. FIG. 2 diagrammatically illustrates a rotor stage 36 having a disk 36A rotatable around the axial rotational axis 30. A plurality of rotor blades 36B extend radially outward from the disk 36A. The rotor blades 36B are circumferentially distributed around the disk 36A. FIG. 1 diagrammatically illustrates a shroud assembly 38 disposed radially outside a rotor stage of the HPT 28A.

Air entering the engine 20 passes through the LPC 24A and the HPC 24B before entering the combustor section 26. Air passed into the combustor section 26 is mixed with fuel and is combusted. Non-combusted air and gaseous byproducts of the combustion exit the combustor section 26 and pass through the turbine section 28 before exiting the engine 20. To facilitate the description herein, air or gaseous combustion products, or any combination thereof will be referred to as "core gas" hereinafter, unless noted otherwise. The present disclosure is not limited to use with a gas turbine engine configuration like that shown in FIG. 1; e.g., the present disclosure may be used with other gas turbine engine architectures such as turbojets, turboshafts, and the like.

A gas turbine engine 20 according to the present invention may be used to produce power for an aircraft or may be used in a land-based application. The aircraft may be an airplane, a helicopter, a drone (e.g., an unmanned aerial vehicle (UAV)) or any other manned or unmanned aerial vehicle or system.

The terms "forward" and "aft" are used herein to indicate the relative position of a component or surface. When referring to an axial flow gas turbine engine 20 like that shown in FIG. 1, a "forward" or "upstream" component encounters core gas flow prior to an "aft" or "downstream" second component; e.g., the compressor section 24 is forward/upstream of the combustor section 26, and the turbine section 28 is aft/downstream of the combustor section 26. The terms "inner radial" and "outer radial" refer to relative radial positions from the engine rotational axis 30; e.g., an inner radial component is disposed radially closer to the axis 30 than an outer radial component.

Figure 3:
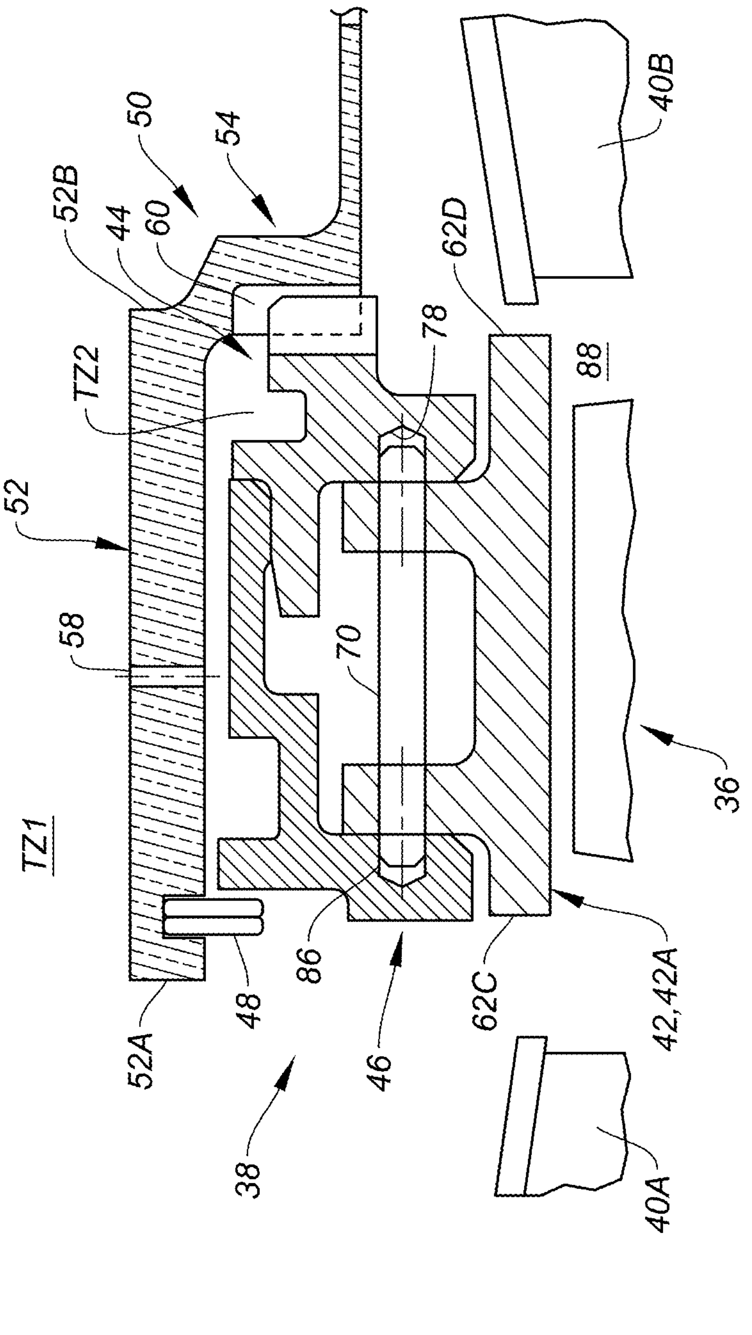
FIG. 3 is a diagrammatic view of a present disclosure shroud assembly embodiment disposed radially outside of a rotor stage.

FIG. 3 diagrammatically illustrates an annular shroud assembly 38 disposed radially outside of a turbine rotor stage 36; e.g., an enlarged view of the shroud assembly shown in FIG. 1. The turbine rotor stage 36 is disposed between a forward vane stage 40A and an aft vane stage 40B. The shroud assembly 38 includes a shroud 42, a shroud segment housing 44, and a cover 46. In some embodiments (e.g., like that shown in FIG. 3), the shroud assembly 38 may include a cover retaining ring 48.

Figure 4:
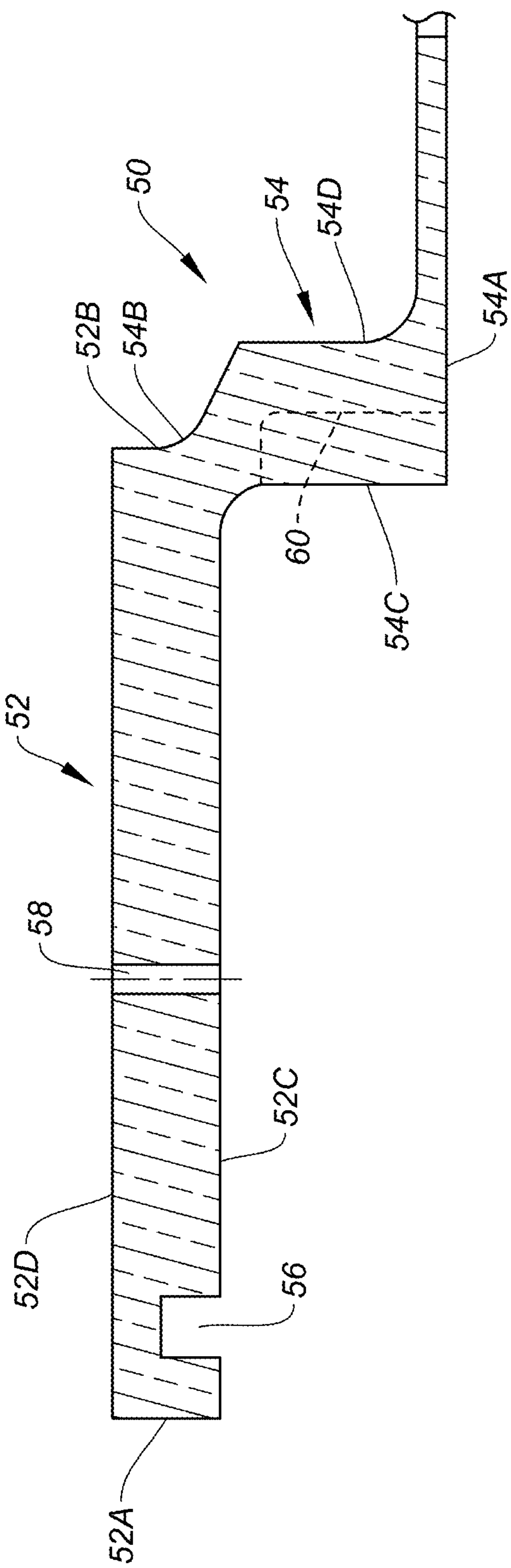
FIG. 4 is a diagrammatic view of a turbine support case.

As shown in FIG. 3, the annular shroud assembly 38 is engaged with an annular turbine support case 50. FIG. 4 illustrates a cross-sectional view of the turbine support case 50 shown in FIG. 3. The turbine support case 50 includes an axially extending first flange segment 52 and a radially extending second flange segment 54. The first flange segment 52 extends axially between a forward end 52A and an aft end 52B. The second flange segment 54 extends radially between an inner radial end 54A and an outer radial end 54B. The aft end 52B of the first flange segment 52 is connected to the outer radial end 54B of the second flange segment 54. The turbine support case 50 may be a unitary structure that includes the first flange segment 52 and the second flange segment 54. The description herein of the first flange segment 52 extending "axially" between the forward end 52A and the aft end 52B is not intended to limit the first flange segment 52 configuration other than the forward end 52A being disposed axially forward of the aft end 52B. Similarly, the description herein of the second flange segment 54 extending "radially" between the inner radial end 54A and the outer radial end 54B is not intended to limit the second flange segment 54 configuration other than the inner radial end 54A being disposed radially inward of the outer radial end 54B. The first flange segment 52 has a radial thickness that extends between an inner radial side 52C and an outer radial side 52D. In those embodiment of the shroud assembly 38 that include a cover retaining ring 48, the first flange segment 52 may include an annular slot 56 open to the inner radial side 52C for receiving the cover retaining ring 48. In some embodiments, a plurality of cooling apertures 58 may extend between the outer radial side 52D and the inner radial side 52C of the first flange segment 52 to permit a flow of cooling air therethrough. The second flange segment 54 has an axial thickness that extends between a forward axial surface 54C and an aft axial surface 54D. One or more slots 60 (the slots are indicated in FIG. 4 by dashed line) are disposed in the forward axial surface 54C of the second flange segment 54; see also FIG. 15. Each slot 60 is configured to receive a lug as will be detailed herein.

Figure 5:
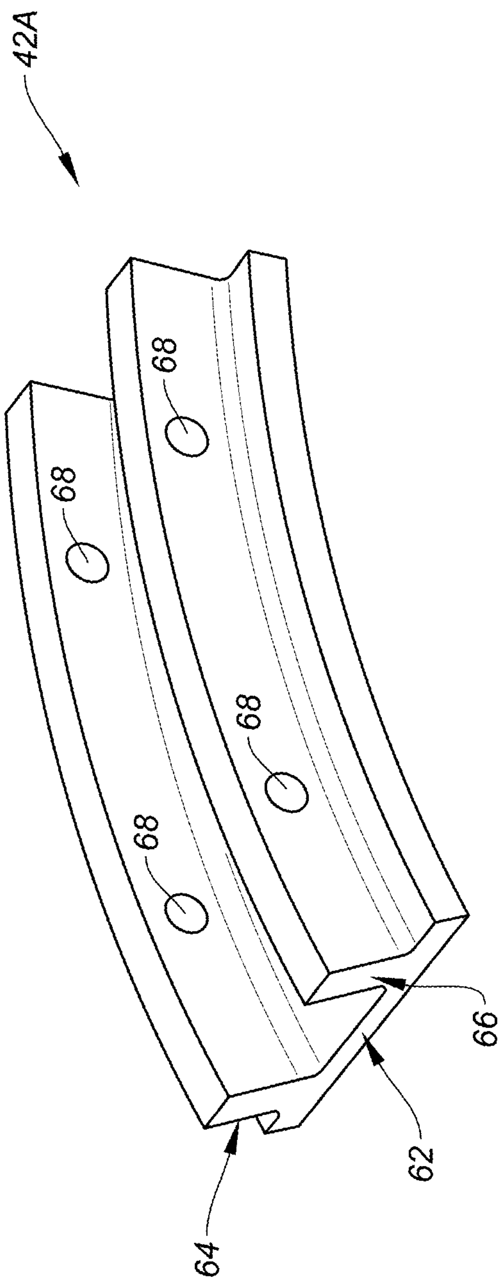
FIG. 5 is a diagrammatic perspective view of a present disclosure shroud segment embodiment.
Figure 6:
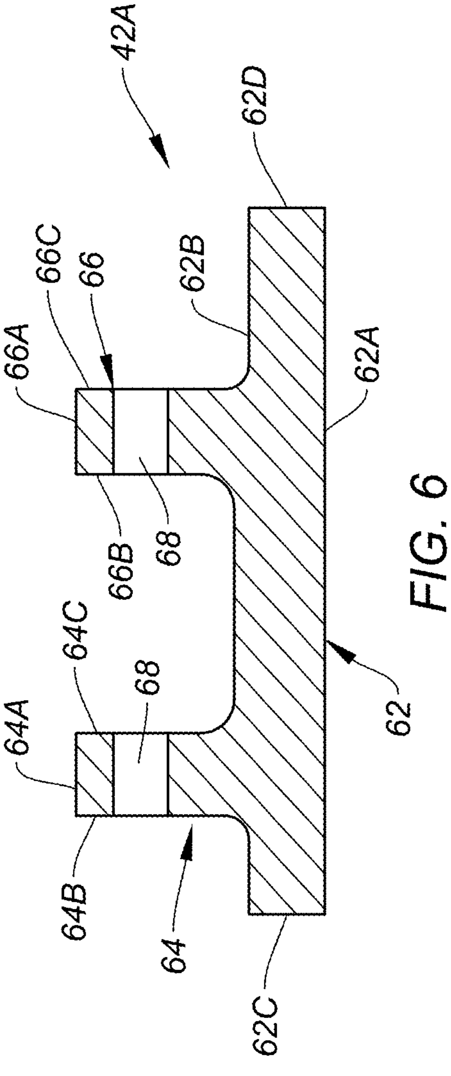
FIG. 6 is a diagrammatic sectional view of a present disclosure shroud segment embodiment.

Referring to FIGS. 5 and 6, the shroud 42 is an annular structure collectively formed from a plurality of shroud segments 42A. FIG. 5 diagrammatically illustrates a shroud segment 42A. The shroud segments 42A may comprise a ceramic matrix composite material. Non-limiting examples of CMC matrix materials include alumina, silicon carbide, aluminum nitride, silicon nitride, and the like. Non-limiting examples of CMC fiber materials include carbon, alumina, silicon carbide, mullite, and the like. The present disclosure is not limited to any particular CMC configuration.

Each shroud segment 42A includes a ring portion 62, a forward leg 64, and an aft leg 66. The ring portion 62 includes a radial thickness that extends between an inner radial surface 62A and an outer radial surface 62B. The ring portion 62 extends axially between a forward end 62C and an aft end 62D; see also FIG. 3. The forward leg 64 and the aft leg 66 both extend radially outward from the outer radial surface 62B of the ring portion 62. The forward leg 64 extends a distance (i.e., a "height") from the outer radial surface 62B of the ring portion 62 to a distal end surface 64A. The forward leg 64 has a thickness that extends between a forward surface 64B and an aft surface 64C. The forward leg 64 is disposed adjacent the forward end 62C of the ring portion 62. The aft leg 66 extends a distance (i.e., a "height") from the outer radial surface 62B of the ring portion 62 to a distal end surface 66A. The aft leg 66 has a thickness that extends between a forward surface 66B and an aft surface 66C. The aft leg 66 is disposed adjacent the aft end 62D of the ring portion 62 and spaced apart from the forward leg 64. In the embodiment shown in FIGS. 5 and 6, the heights of the forward leg 64 and the aft leg 66 are substantially equal and the thicknesses of the forward leg 64 and the aft leg 66 are substantially equal. The present disclosure does not require the forward and aft legs 64, 66 to have the same height and/or thickness.

Referring to FIGS. 3, 5, and 6, the forward leg 64 and the aft leg 66 of each shroud segment 42A contains at least one pin aperture 68 configured to receive a shroud pin 70; e.g., see FIG. 3. In the embodiment shown in FIG. 5, the forward leg 64 and the aft leg 66 of each shroud segment 42A contains a pair of pin apertures 68.

Figure 8:
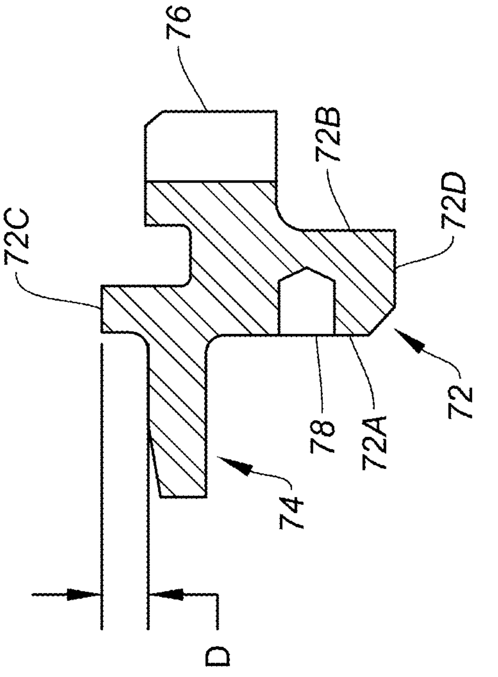
FIG. 8 is a diagrammatic view of a present disclosure shroud segment housing embodiment.
Figure 7:
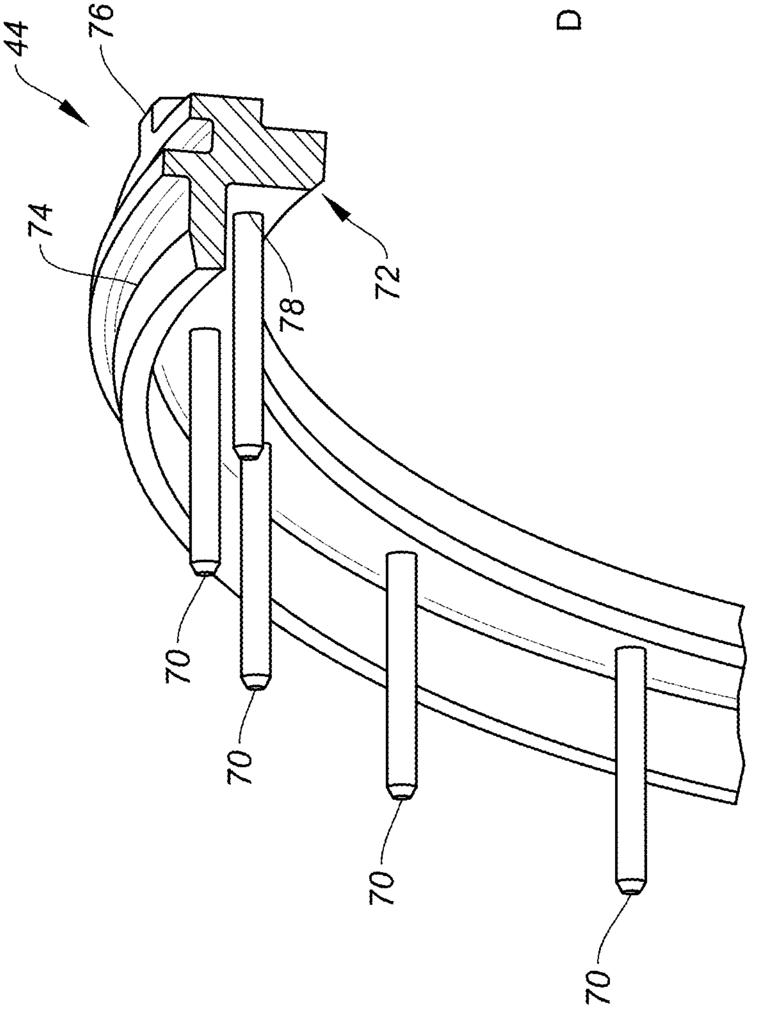
FIG. 7 is a diagrammatic perspective view of a present disclosure shroud segment housing embodiment.

Referring to FIGS. 3, 7, and 8, the shroud segment housing 44 is an annular structure that includes a central member 72, a forward flange 74, and lugs 76. The central member 72 has a forward side 72A, an aft side 72B, an outer radial end 72C, and an inner radial end 72D. The forward flange 74 extends outwardly from the forward side 72A of the central member 72 and is spaced a distance "D" from the outer radial end 72C. A plurality of pin apertures 78 are disposed in the central member 72 (e.g., radially inward of the forward flange 74) distributed around the circumference of the shroud segment housing 44. Each pin aperture 78 is configured to receive one end of a shroud pin 70. FIG. 7 illustrates shroud pins 70 mounted in the pin apertures 78. A plurality of lugs 76 extend axially outward from the aft side 72B of the central member 72. In some embodiments, each lug 76 may be configured and circumferentially positioned to be received within a corresponding slot 60 disposed in the forward axial surface 54C of the second flange segment 54 as detailed above; e.g., see FIG. 4. For example, the lugs 76 and slots 60 may be configured as mating male and female pairs. In some embodiments, the number of lugs 76 equals the number of slots 60. In some embodiments, the number of lugs 76 may be less than the number of slots 60. In alternative embodiments, the slots 60 may be disposed in the shroud segment housing 44 and the lugs 76 may be disposed with the turbine support case 50. The lugs 76 and slots 60 are non-limiting examples of a shroud segment housing 44/turbine support case 50 configuration that allows relative movement between the shroud segment housing 44/turbine support case 50. The present disclosure is not limited to a lug 76 and slot 60 configuration.

Figure 9:
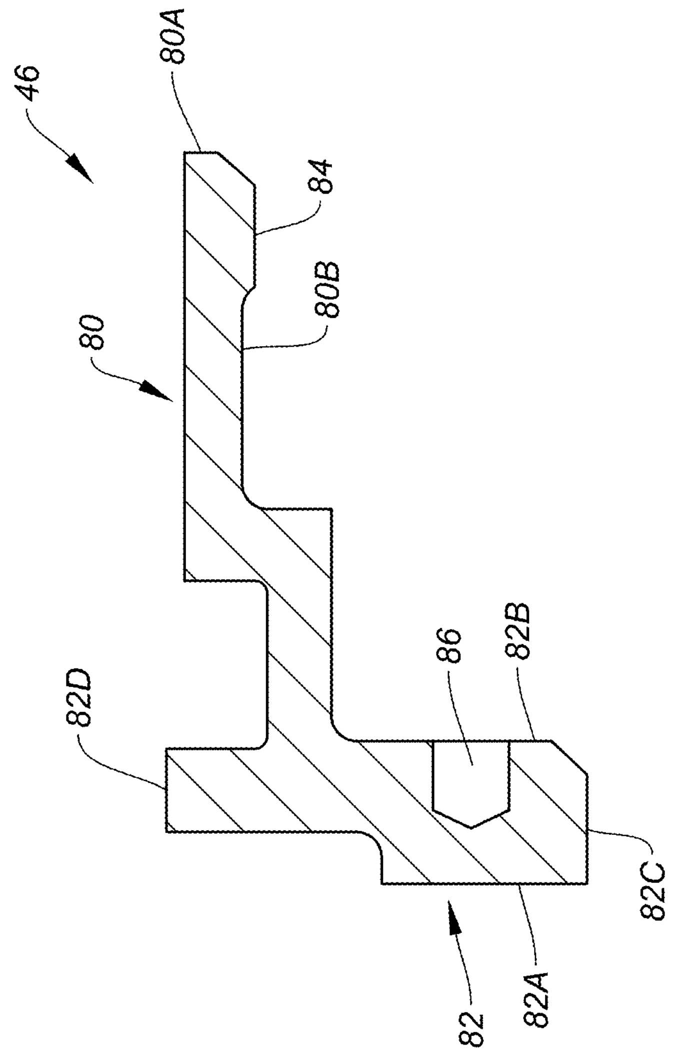
FIG. 9 is a diagrammatic view of a present disclosure cover embodiment.

Referring to FIGS. 3 and 9, the cover 46 is an annular structure that includes an axial segment 80 and a radial segment 82. The axial segment 80 has a distal end 80A, an inner radial side 80B, and an outer radial side 80C. The radial segment 82 has a forward side 82A, an aft side 82B, an inner radial end 82C, and an outer radial end 82D. The axial segment 80 extends outwardly from the aft side 82B of the radial segment 82. A contact surface 84 is disposed on the inner radial side 80B of the axial segment 80 adjacent the distal end 80A of the axial segment 80. A plurality of pin apertures 86 are disposed in the radial segment 82 open to the aft side 82B of the radial segment 82. The pin apertures 86 are disposed radially inward of the axial segment 80 and are distributed around the circumference of the shroud segment housing 44. Each pin aperture 86 is configured to receive one end of a shroud pin 70.

Figure 10:
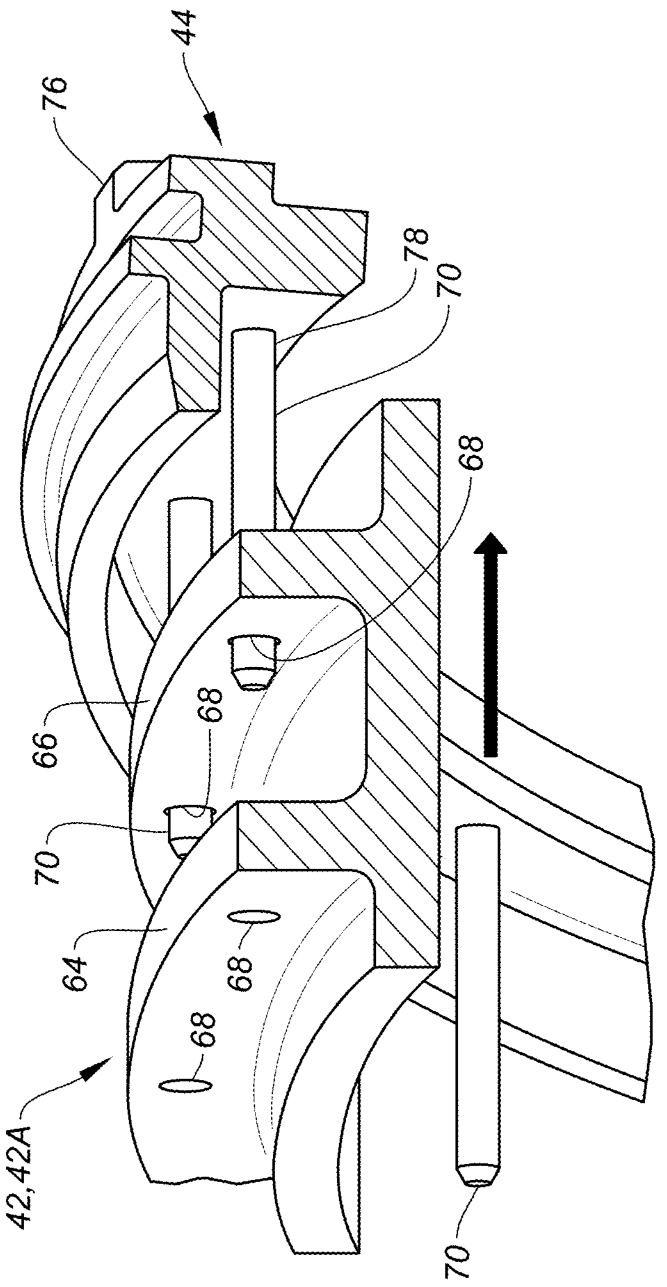
FIG. 10 is a diagrammatic view of a present disclosure shroud assembly during assembly.
Figure 11:
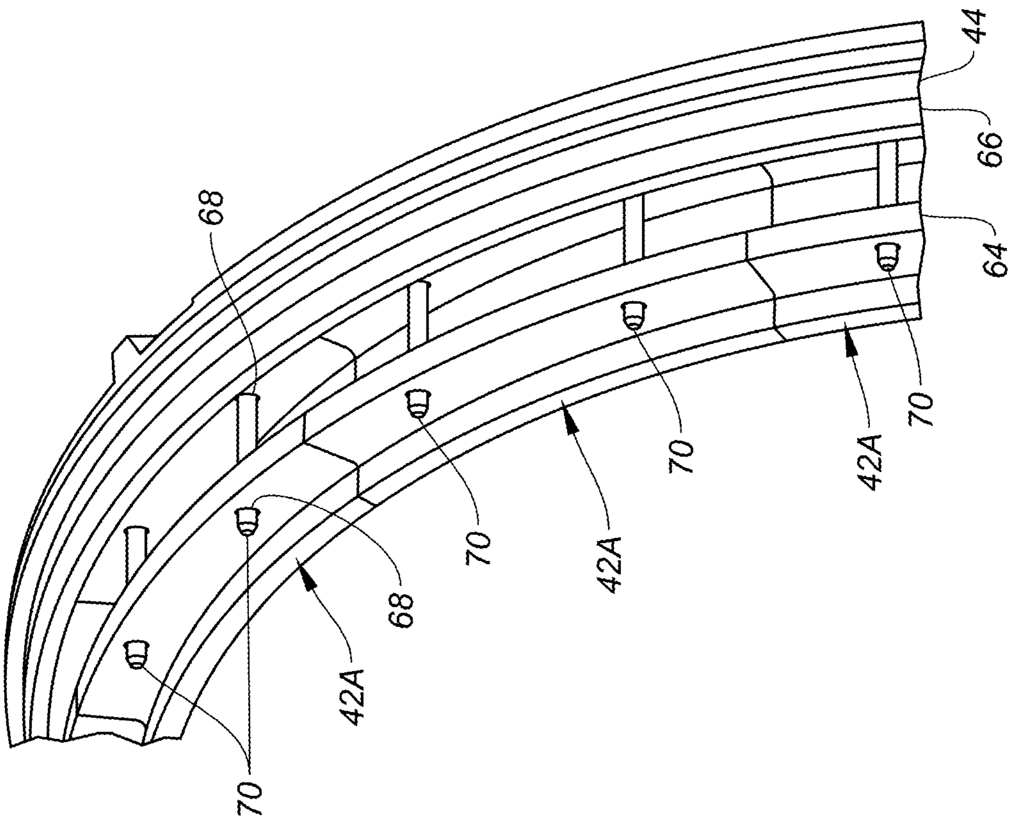
FIG. 11 illustrates a plurality of shroud segments assembled to collectively form the annular shroud, mounted on the shroud segment housing.
Figure 12:
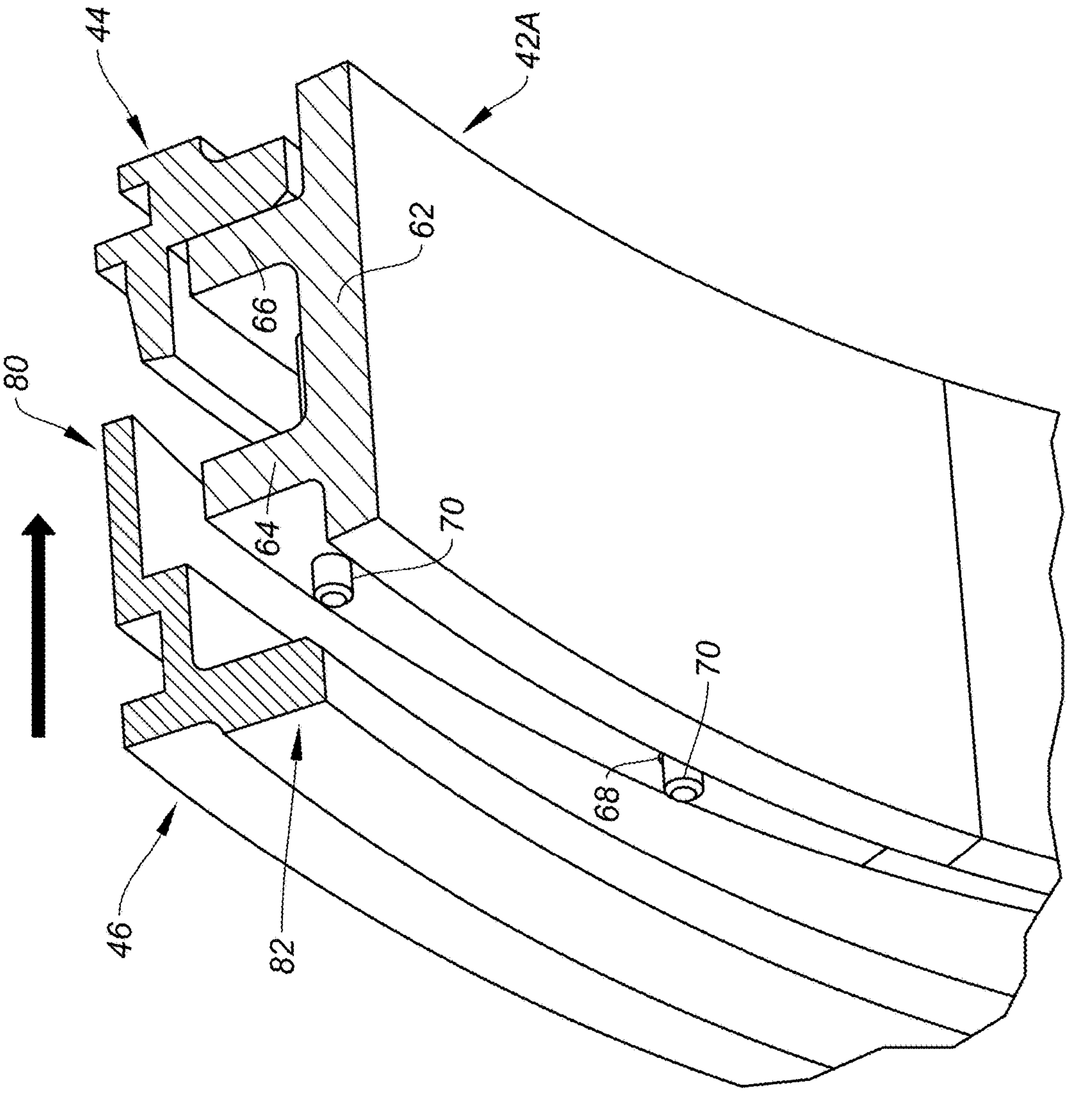
FIG. 12 is a diagrammatic view of a present disclosure shroud assembly during assembly.

Referring to FIG. 10, during assembly one end of the shroud pins 70 may be inserted into the pin apertures 78 disposed within the shroud segment housing 44; see also FIG. 7. The shroud segments 42A may then be mounted to the shroud segment housing 44 by passing the shroud pins 70 through the pin apertures 68 in the forward and aft legs 64, 66 of the shroud segment 42A. FIG. 11 illustrates a plurality of shroud segments 42A mounted on the shroud segment housing 44. As can be seen in FIG. 11, when the shroud segments 42A are mounted on the shroud segment housing 44 a portion of the shroud pins 70 extends outwardly from the forward leg 64 of the shroud segments 42A. FIG. 12 illustrates the cover 46 being mounted with the shroud 42 and the shroud segment housing 44. During the mounting of the cover 46 to the shroud 42 and should segment housing, the portions of the shroud pins 70 that are exposed at the forward legs 64 of the shroud segments 42A are received within the pin apertures 86 disposed in the radial segment 82 of the cover 46; e.g., see FIGS. 3 and 9.

Figure 13:
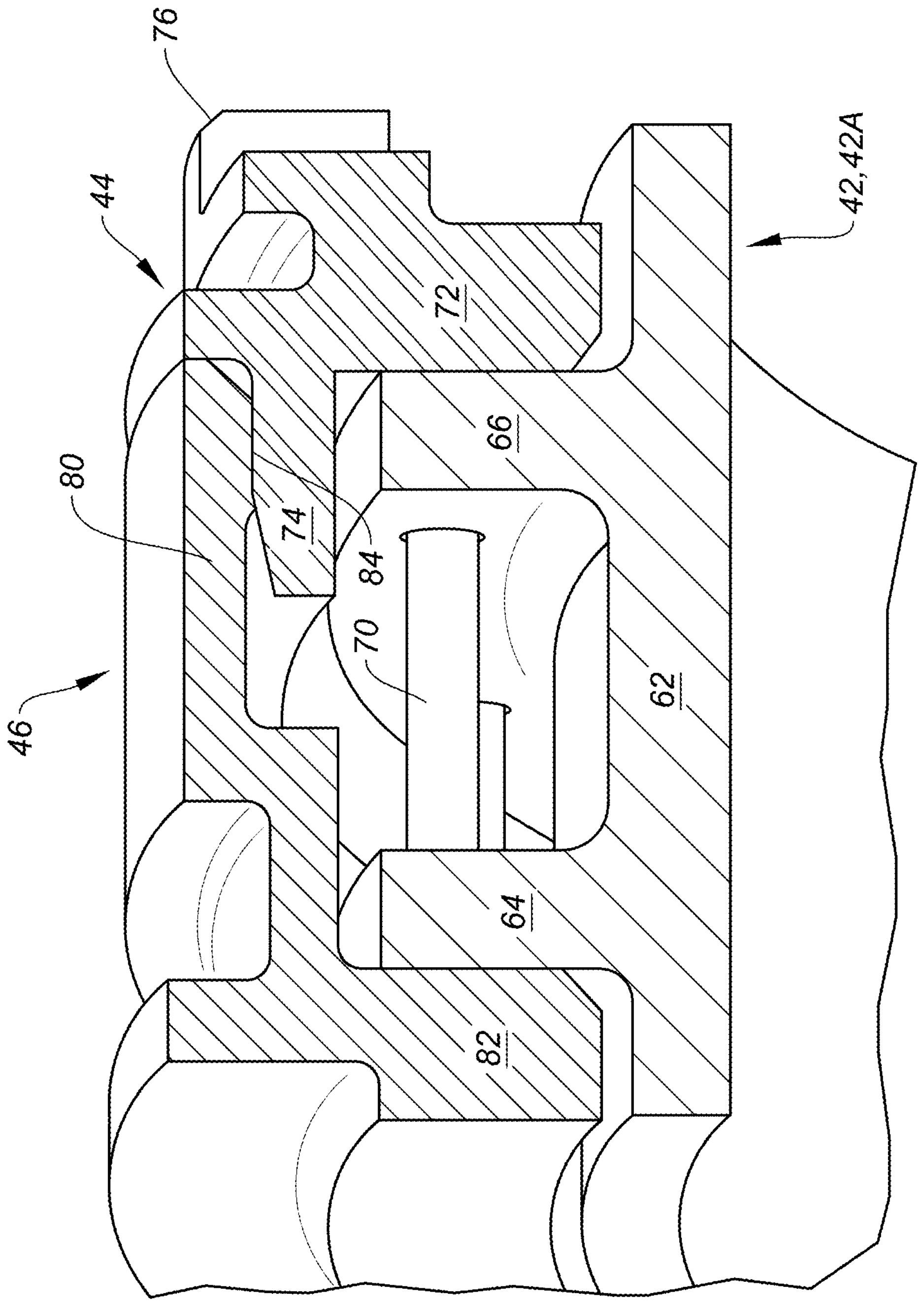
FIG. 13 is a diagrammatic view of a present disclosure shroud assembly in assembled form.

FIG. 13 illustrates the cover 46 now mounted with the shroud 42 and the shroud segment housing 44, with the shroud pins 70 connecting the shroud 42, shroud segment housing 44, and the cover 46; e.g., see also FIG. 3. In the assembled state, the contact surface 84 of the axial segment 80 of the cover 46 is in contact with the forward flange 74 of the shroud segment housing 44. In some embodiments, the fit between the contact surface 84 of the axial segment 80 and the forward flange 74 of the shroud segment housing 44 may be a slight interference fit.

Figure 14:
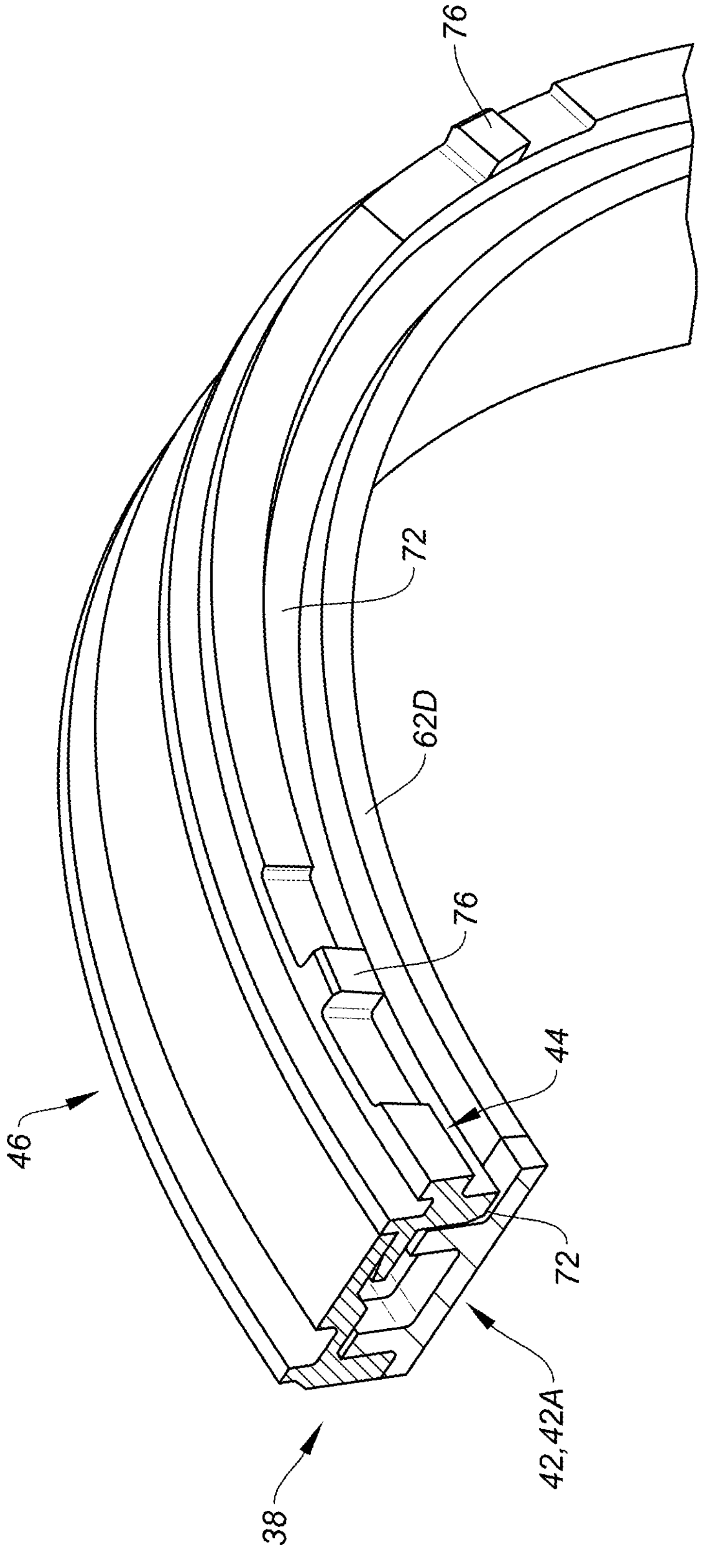
FIG. 14 is a diagrammatic view of a present disclosure shroud assembly in assembled form in a perspective view from aft to forward.

FIG. 14 also illustrates the shroud 42, shroud segment housing 44, and the cover 46 in an assembled state. FIG. 14 diagrammatically illustrates the structure in a perspective view from aft to forward to illustrate the lugs 76 extending outwardly from the central member 72 of the shroud segment housing 44.

Figure 15:
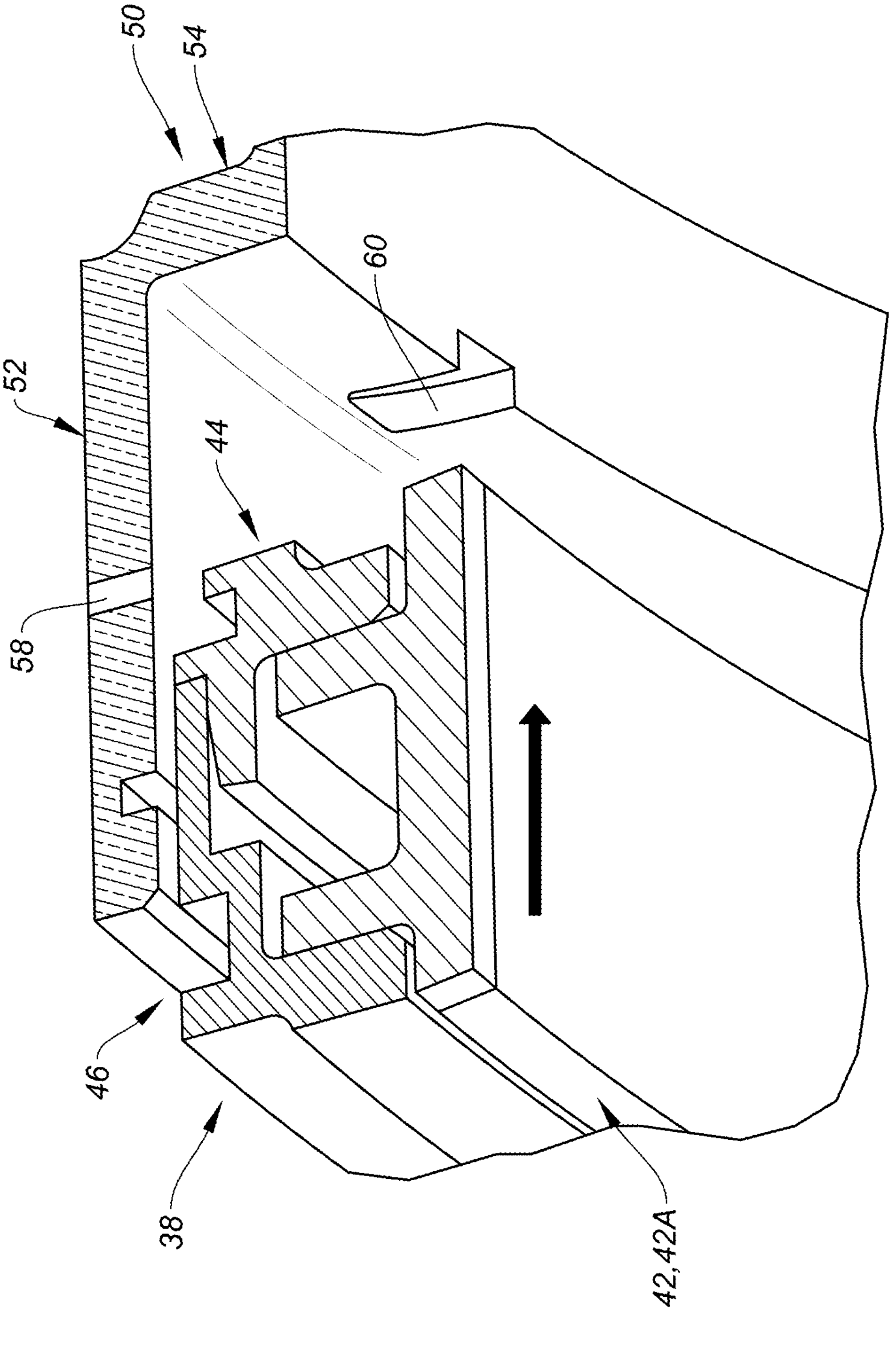
FIG. 15 is a diagrammatic view of a present disclosure shroud assembly (in assembled form) being mounted on the turbine support case.

FIG. 15 illustrates the shroud assembly 38 in assembled form being mounted on the turbine support case 50. In assembled form, the lugs 76 extending out from the shroud segment housing 44 are received within the slots 60 disposed in the turbine support case 50. The slots 60 and lugs 76 are respectively configured to permit radial movement therebetween. The relative radial travel between the slots 60 and lugs 76 accommodates differences in thermal expansion/contraction. This aspect is understood to be a distinct benefit when the shroud 42 comprises a ceramic matrix composite material that has thermal expansion characteristics that differ from the thermal expansion characteristics of the shroud assembly 38 components (i.e., the shroud segment housing 44, the cover 46, and the turbine support case 50).

As described herein and referring to FIG. 3, in some embodiments the turbine support case 50 may include cooling air apertures 58 that provide fluid communication with between a first region (referred to as thermal zone 1 or "TZ1") disposed radially outside of the turbine support case 50, and a second region (referred to as thermal zone 2 or "TZ2") disposed radially inside of the turbine support case 50. During operation of the gas turbine engine 20, core gases disposed in the core gas path 88 radially inside of the shroud 42 are at very high temperatures. Cooling air at an elevated pressure is disposed in TZ1. The elevated pressure provides the motive force to drive a flow of the cooling air through the cooling apertures 58 and into TZ2. The temperature of the cooling air entering TZ2 from TZ1 is lower than the temperature of the air otherwise in TZ2 which is influenced by the high temperature core gas in the core gas path 88.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A gas turbine engine having an axial centerline, the gas turbine engine comprising:

a compressor section;

a combustor section; and a turbine section, wherein the turbine section includes a rotor stage and an annular shroud assembly, wherein the rotor stage includes a bladed rotor;

wherein the annular shroud assembly is disposed radially outside of the bladed rotor, and extends circumferentially around the bladed rotor, and is coupled with a turbine support case, wherein the annular shroud assembly comprises:

a shroud comprising a plurality of shroud segments that collectively form the shroud, wherein each shroud segment includes a ring portion, a forward leg, and an aft leg;

a shroud segment housing;

a cover; and a plurality of shroud pins disposed to connect the shroud to the shroud segment housing and the cover;

wherein the shroud segment housing and the turbine support case are engaged with one another and are configured to permit relative movement therebetween; and wherein the annular shroud assembly and the turbine support case are configured to permit radial movement between the annular shroud assembly and the entirety of the turbine support case.

2. The gas turbine engine of claim 1, wherein the annular shroud assembly is configured to accommodate disparate thermal expansion of the shroud relative to the turbine support case.

3. The gas turbine engine of claim 1, wherein the shroud segment housing and the turbine support case are configured to permit radial movement between the shroud segment housing and the turbine support case.

4. The gas turbine engine of claim 3, wherein the shroud segment housing and the turbine support case are configured with mating male and female elements that permit radial movement between the shroud segment housing and the turbine support case.

5. The gas turbine engine of claim 4, wherein the shroud segment housing includes a plurality of lugs and the turbine support case includes a plurality of slots configured to receive the lugs.

6. The gas turbine engine of claim 5, wherein the turbine support case includes a first flange segment that extends axially out from a radially extending second flange segment, wherein the slots are disposed in the second flange segment.

7. The gas turbine engine of claim 1, wherein each shroud pin of the plurality of shroud pins extends through the forward leg and the aft leg of one of the shroud segments of the plurality of shroud segments.

8. The gas turbine engine of claim 7, wherein the ring portion of each shroud segment of the plurality of shroud segments has an inner radial surface and an outer radial surface and the forward leg and the aft leg extend outwardly from the outer radial surface of the ring portion.

9. The gas turbine engine of claim 7, wherein the shroud segment housing includes a central member and a forward flange, and the plurality of shroud pins are engaged with the central member.

10. The gas turbine engine of claim 9, wherein the cover includes an axial segment and a radial segment, wherein the axial segment is connected to the radial segment and extends outwardly from the radial segment.

11. The gas turbine engine of claim 10, wherein a first end of each shroud pin of the plurality of shroud pins is engaged with the central member, and a second end of each shroud pin of the plurality of shroud pins is engaged with the radial segment.

12. The gas turbine engine of claim 11, wherein the forward flange is in contact with the axial segment.

13. The gas turbine engine of claim 1, wherein the annular shroud assembly further comprises a cover retaining ring engaged with the turbine support case.

14. The gas turbine engine of claim 13, wherein the turbine support case includes a first flange segment that extends axially out from a radially extending second flange segment, wherein the first flange segment includes a ring slot configured to receive the cover retaining ring; and wherein axial movement of the annular shroud assembly is axially constrained by the second flange segment and the cover retaining ring.

15. The gas turbine engine of claim 1, wherein the turbine support case includes a first flange segment that extends axially out from a radially extending second flange segment, and the first flange segment includes a plurality of cooling apertures that provide fluid communication between a first region radially outside of the turbine support case and a second region radially inside of the turbine support case that is in fluid communication with the annular shroud assembly.

16. The gas turbine engine of claim 1, wherein the plurality of shroud segments comprise a ceramic matrix composite material.

17. A rotor stage shroud assembly for a gas turbine engine, the gas turbine engine having a turbine support case and a turbine section that includes a rotor stage with a bladed rotor, wherein the turbine support case is disposed radially outside of the rotor stage, the shroud assembly comprising:

a shroud comprising a plurality of shroud segments that collectively form the shroud, wherein each shroud segment includes a ring portion, a forward leg, and an aft leg;

a shroud segment housing;

a cover; and a plurality of shroud pins disposed to connect the shroud to the shroud segment housing and the cover;

wherein the shroud segment housing and the turbine support case are engaged with one another and are configured to permit relative movement therebetween; and wherein the shroud segment housing is configured to permit radial movement between the shroud segment housing and the entirety of the turbine support case.

18. The rotor stage shroud assembly of claim 17, wherein the shroud segment housing includes a plurality of lugs configured to be received within slots disposed in the turbine support case.

* * * * *